(12) United States Patent
Yoshihara et al.

(10) Patent No.: US 6,836,340 B2
(45) Date of Patent: Dec. 28, 2004

(54) IMAGE PROCESSING APPARATUS

(75) Inventors: Tsutomu Yoshihara, Kanagawa (JP); Takashi Kusanagi, Tokyo (JP); Masataka Isomoto, Kanagawa (JP); Akihisa Shiozaki, Kanagawa (JP); Masahiro Funakoshi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 856 days.

(21) Appl. No.: 09/779,524

(22) Filed: Feb. 9, 2001

(65) Prior Publication Data

US 2001/0021038 A1 Sep. 13, 2001

(30) Foreign Application Priority Data

| Feb. 14, 2000 | (JP) | ........................................ | 2000-035500 |
| Feb. 14, 2000 | (JP) | ........................................ | 2000-035713 |
| Feb. 14, 2000 | (JP) | ........................................ | 2000-035714 |
| Jul. 14, 2000 | (JP) | ........................................ | 2000-214311 |

(51) Int. Cl.[7] ............................ G06F 15/00; H04N 1/04; G03B 27/00
(52) U.S. Cl. ........................ 358/1.15; 358/474; 355/19
(58) Field of Search ............................... 358/1.15, 1.3, 358/501, 505, 508, 474, 498, 1.1; 355/19, 407; 341/22; 347/3

(56) References Cited

U.S. PATENT DOCUMENTS 6,462,839 B1 * 10/2002 Short .......................... 358/474
6,671,060 B1 * 12/2003 Fresk et al. ................ 358/1.15

* cited by examiner

*Primary Examiner*—Mark Wallerson
*Assistant Examiner*—Thomas J Lett
(74) *Attorney, Agent, or Firm*—Fitzpatrick, Cella, Harper & Scinto

(57) ABSTRACT

A multifunctional image processing apparatus which is capable of coping with changes expected to take place in office environment in the future, includes image forming means for forming an image on a sheet, image reading means, disposed above the image forming means with a void space part formed between the image forming means and the image reading means, for reading image information from an original having the image information recorded thereon, and a sheet delivery part arranged to deliver the sheet having the image formed thereon by the image forming means into the void space part formed between the image forming means and the image reading means, wherein the image reading means is supported by a support part provided on a frame body in which the image forming means is housed, and is arranged to be horizontally swingable around the support part.

11 Claims, 8 Drawing Sheets

ID_PROCESSING APPARATUS

IMAGE PROCESSING APPARATUS

BACKGROUND OF THE INVENTION

1. Field of the Invention

The present invention relates to an image processing apparatus arranged to perform processes for forming an image on a sheet on the basis of image information obtained by reading an image recorded on an original or image information transmitted through a network.

2. Description of Related Art

The recent advancement of digital technology and network technology has caused office automation equipments such as a copying machine, a facsimile set, a printer, etc., to become more multifunctional. As a result, these office automation equipments are changing from the conventional stand-alone type toward such information equipments that are capable of serving as network terminals.

Changes in office environment expected to take place in the future suggest creation of a apace wherein office automation equipments will change to information apparatuses to be used as information terminals for office work by taking out in real time or reading such electronic information or paper information that is gathering there. For such new office spaces, multifunctional image processing apparatuses are expected to be developed as information apparatuses of the new generation.

At present, however, no multifunction image processing apparatuses are arranged to be capable of coping with the coming changes of office environment. All the currently known apparatuses are designed for use in a space having office equipments gathered there like the conventional office or at a corner of an office room or a living room. In other words, there are no image processing apparatuses designed to be capable of coping with anticipated changes of office environment when the changes come to take place as mentioned above.

BRIEF SUMMARY OF THE INVENTION

The invention is made in view of the problem mentioned above. It is, therefore, an object of the invention to provide a multifunctional image processing apparatus which is capable of coping with changes which will take place in office environment in the future.

To attain the above object, in accordance with an aspect of the invention, there is provided an image processing apparatus, comprising image forming means for forming an image on a sheet, image reading means, disposed above the image forming means with a void space part formed between the image forming means and the image reading means, for reading image information from an original having the image information recorded thereon, and a sheet delivery part arranged to deliver the sheet having the image formed thereon by the image forming means into the void space part formed between the image forming means and the image reading means, wherein the image reading means is supported by a support part provided on a frame body in which the image forming means is housed, and is arranged to be horizontally swingable around the support part.

The above and other objects and features of the invention will become apparent from the following detailed description of a preferred embodiment thereof taken in connection with the accompanying drawings.

DETAILED DESCRIPTION OF THE INVENTION

Hereinafter, a preferred embodiment of the invention will be described in detail with reference to the drawings.

Figure 1:
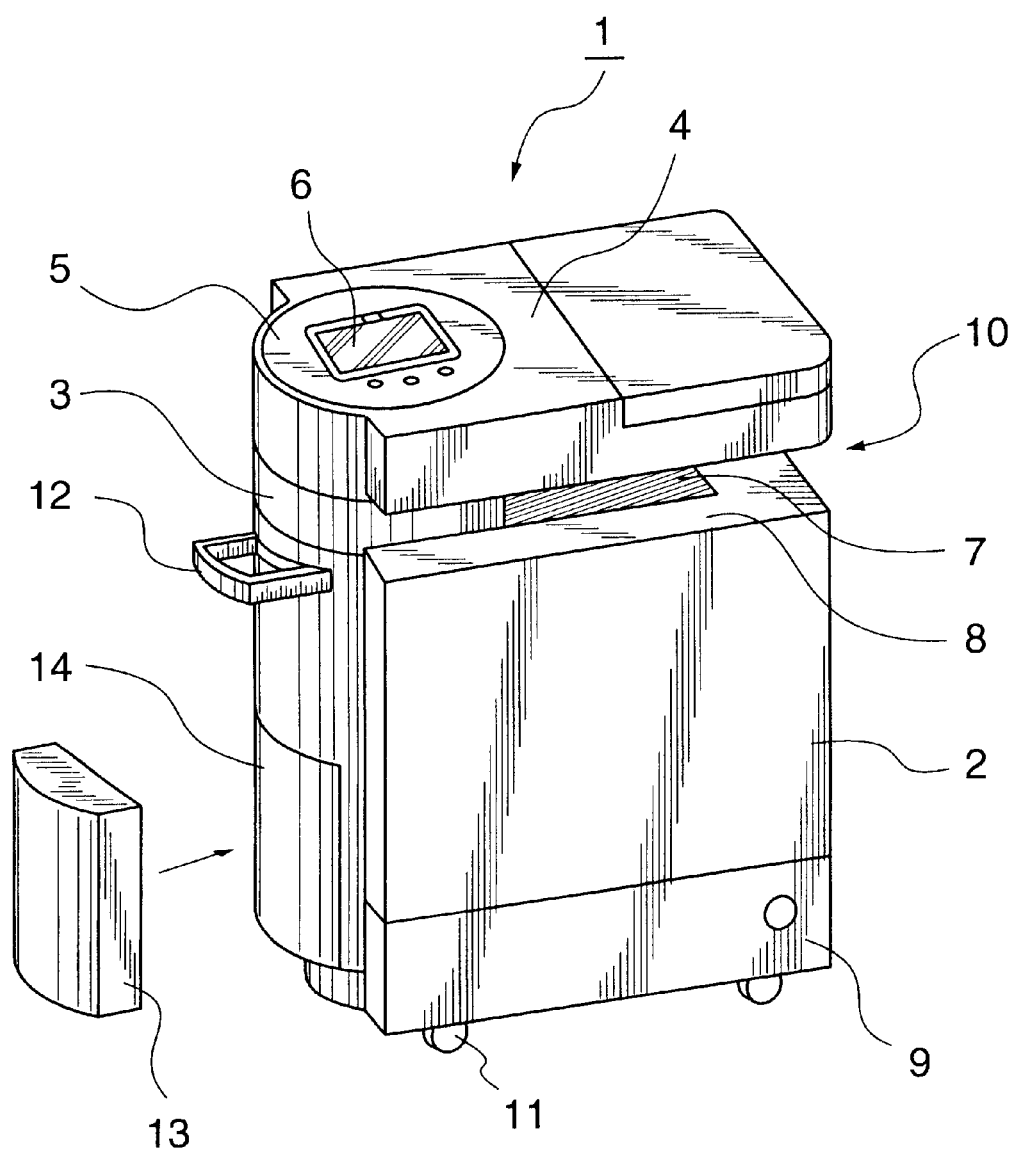
FIG. 1 is a perspective view showing in outline an image processing apparatus according to an embodiment of the invention.

FIG. 1 is a perspective view showing in outline a digital-type copying machine 1 serving as an image processing apparatus according to the embodiment of the invention.

Referring to FIG. 1, the arrangement of the copying machine 1 will be described. An image forming part 2 has a frame body which contains therein an image forming means for forming an image on a sheet. A sheet cassette 9 in which sheets for use in forming images thereon are stacked up is disposed below the frame body of the image forming part 2. A paper supply means (not shown) disposed inside the image forming part 2 is arranged to send the sheets out from the inside of the sheet cassette 9 to the image forming means.

The image forming means disposed inside the image forming part 2 may be arranged to operate in any of known image forming methods. For example, in the case of an electrophotographic method, the image forming means forms an electrostatic latent image on a photosensitive member, after that, the latent image is developed by means of a developing agent such as a toner or the like, and the image thus developed is transferred to a sheet. The electrophotographic method may be replaced with an ink-jet recording method whereby an image is formed on a sheet by discharging ink on the sheet, or with any other image forming method, such as a thermal transfer method.

The copying machine 1 is provided with casters 11 which are arranged at the bottom part of the copying machine 1 to make the copying machine 1 freely movable. Further, at a support part 3 (to be described later in detail), there is provided a handle 12 which can be drawn outward and stowed in the support part 3 to enable the user to easily move the copying machine 1. With the copying machine 1 provided with the casters 11 and the handle 12, the user is enabled to freely move the copying machine 1 to any desired space so as to use the copying machine 1 in any of various situations.

The arrangement for freely moving the copying machine 1 is not limited to the casters 11 and the handle 12. The arrangement may be replaced with any different arrangement as long as it enables the user to easily move the copying machine 1.

An image reading part 4 is arranged to read image information recorded on an original by illuminating the original with light by an optical means (not shown), such as a mirror and a sensor, and to perform a digital signal processing action on the thus-read optical image information by a converting means (not shown), such as an A/D converter.

The image information read from the original and converted into a digital signal by the converting means is not only transmitted to the image forming part 2 so as to be used for forming an image on a sheet at the image forming means but also can be transmitted through a network line to a facsimile receiver or transmitted as an electronic mail. The digital signal can be transmitted also by wireless communication.

The image reading means of the image reading part 4 may be arranged either according to a reading method whereby the original image is placed on a platen glass and the surface of the original is scanned with an optical means or according to a stream transmission reading method whereby an original being transported at a fixed speed is illuminated with light and the thus-obtained reflection light is read by a contact image sensor.

The support part 3 is arranged to support the image reading part 4, which has the image reading means and is disposed above the image forming part 2 across a void space part 10 existing there. The support part 3 is provided integrally with the frame body of the image forming part 2 and has sufficient strength to support the image reading part 4.

Further, the support part 3 is provided with a space 14 for setting there a battery 13 as an electric power storage means for supplying electric power to the copying machine 1. With the battery 13 connected to the setting space 14 as shown in FIG. 1, the battery 13 obviates the necessity of connecting the copying machine 1 to any outlet through a power supply cord for supplying electric power to the copying machine 1. The use of the battery 13 further increases the latitude of selecting a space for installing the copying machine 1. The arrangement enables the user to move the copying machine 1 to a desired space and to use the copying machine 1 in a desired environment, so that the usability of the copying machine 1 can be made better than that of the conventional copying machine.

The copying machine 1 is of course usable by connecting the copying machine 1 to an external power source by a cord, as in the conventional copying machine. Further, with the battery 13 connected to the copying machine 1, it is also possible to store electric power of an external power source in the battery 13 through the copying machine 1.

At the void space part 10 formed between the image forming part 2 and the image reading part 4 supported by the support part 3, a sheet having an image formed thereon by the image forming part 2 is delivered. Thus, the sheet is discharged and stacked on a sheet delivery tray 7 provided on the upper surface 8 of the image forming part 2.

An operation part 5, which is disposed above the support part 3, is arranged to enable the user to control and direct the operation of the copying machine 1. In the operation part 5, there is incorporated a touch-sensor-type display 6 for enabling the user to perform an input operation on the copying machine 1 by touching the screen of the display 6. Further, the display 6 functions also as a display means for displaying the state, etc., of the copying machine 1.

Figure 2:
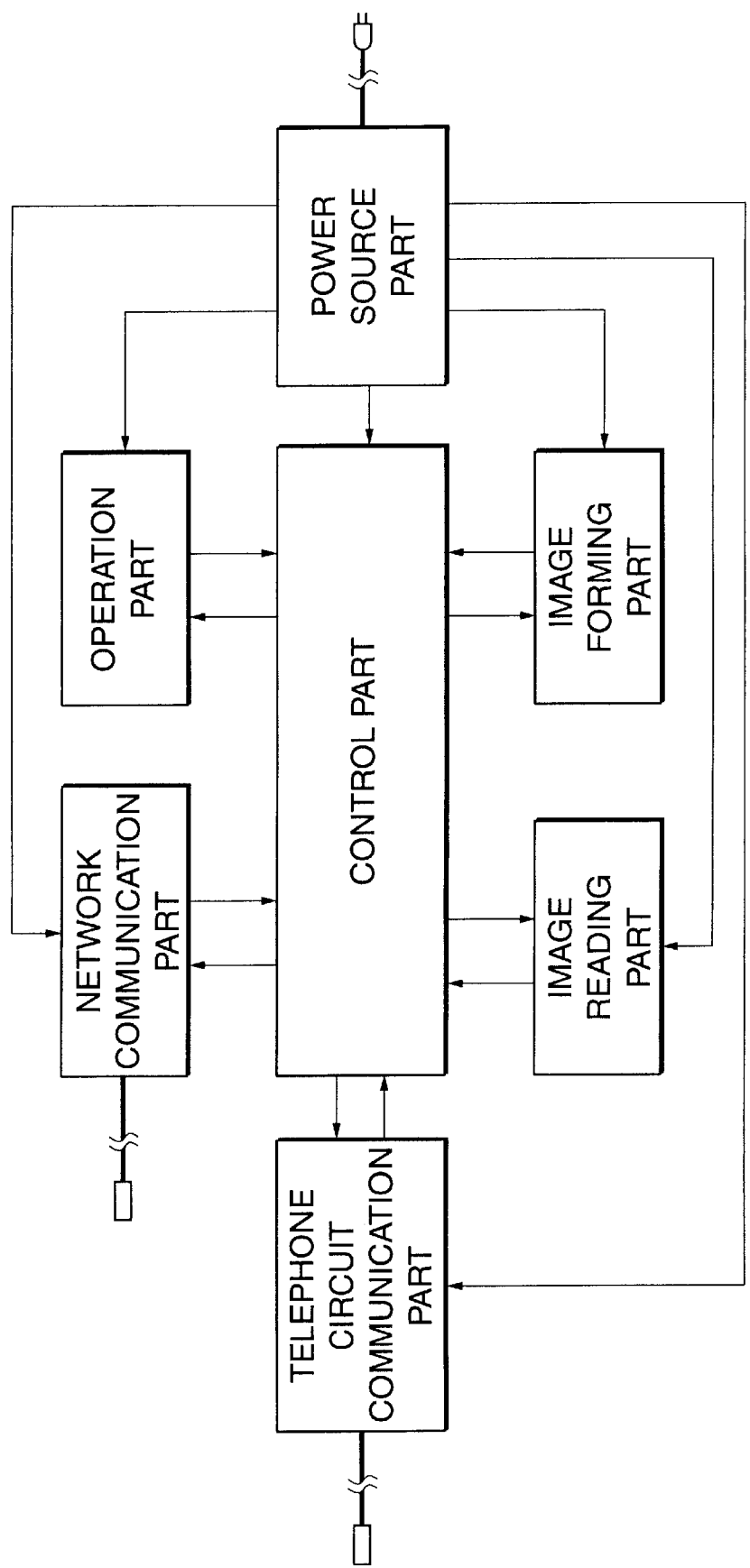
FIG. 2 is a block diagram showing in outline a control system of the image processing apparatus according to the embodiment of the invention.

FIG. 2 is a block diagram showing in outline the arrangement of a control system of the image processing apparatus (the copying machine 1). As shown in FIG. 2, a control part is arranged at the center of the apparatus to control the whole apparatus and to store and keep data there. The operation part, the image forming part, the image reading part, a telephone circuit communication part, a network communication part are connected to the control part. A power source part is arranged to obtain electric power either from the battery 13 or from an external power source, as mentioned above.

Figure 3:
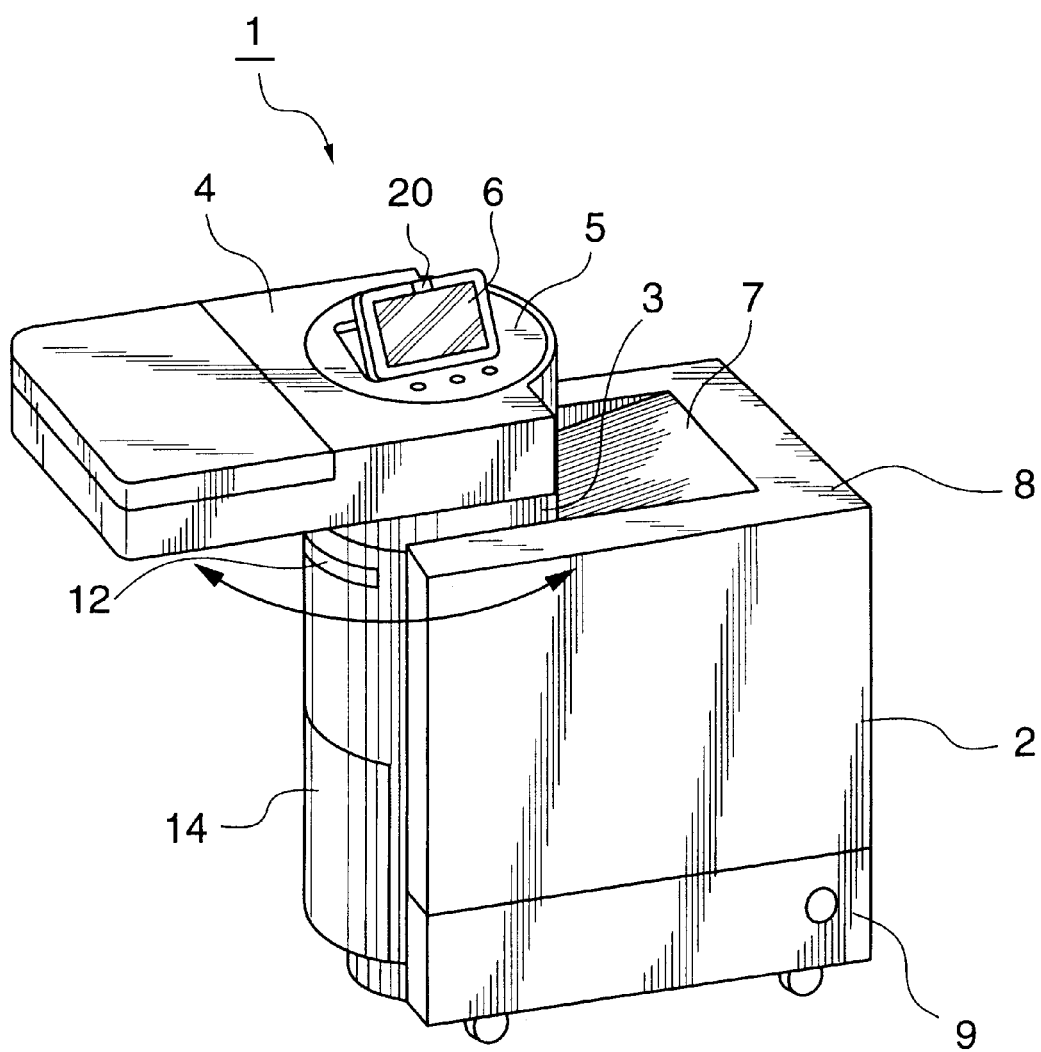
FIG. 3 is a perspective view showing the operation of the image processing apparatus according to the embodiment of the invention.

The operation of the image processing apparatus (the copying machine 1) according to the embodiment of the invention will be described with reference to FIG. 3 as follows. FIG. 3 shows the copying machine 1 in a state obtained by horizontally turning the image reading part 4 around the support part 3 in directions indicated by arrows. Since the image reading part 4 is thus supported in such a way as to be horizontally swingable with respect to the support part 3, the relative positions of the image reading part 4 and the image forming part 2 are changeable by swinging the image reading part 4 around the support part 3.

The swinging motion of the image reading part 4 can be effected by means of bearings and gears (not shown) provided at connection parts between the support part 3 and the image reading part 4. It is also possible to arrange the image reading part 4 to be automatically swingable by disposing a motor or the like inside the support part 3 to act in response, for example, to an operation performed by the user. The details of the internal arrangement of the support part 3 and other parts around the support part 3 within the copying machine 1 will be described later herein with reference to FIGS. 5 and 6.

When the image reading part 4 has been swung in the directions indicated by the arrows shown in FIG. 3, the user can easily recognize the image-formed sheet discharged on the sheet delivery tray 7. The arrangement prevents the user from forgetting to take out the sheet and also enables the user to take out the sheet without stooping down. The arrangement thus effectively contributes to an improvement in usability.

Further, as shown in FIG. 3, the display 6 of the operation part 5, which is disposed above the support part 3, is arranged to be freely erectable, by means of a tilt-up structure (not shown), in such a manner as to make the display 6 easily operable and easily viewable by the user.

Further, on the frame part of the display 6, there is provided a transmitting-receiving part 20 arranged for data communication with some external terminal by means of a wireless signal, such as infrared rays, an electromagnetic wave (radio wave) or the like. The transmitting-receiving part 20 allows wireless access to a portable-type information terminal having a wireless communication function conforming to, for example, communication standards such as IrDA, Bluetooth, etc.

In addition to the advantage in respect to the enhanced latitude for selecting the installing place, the wireless network connection to external terminals enables the user to exchange data through the copying machine 1 and to use the copying machine 1, i.e., the image processing apparatus, as a data server or a network server.

Since the image reading part 4 is horizontally swingable around the support part 3 with respect to the image forming part 2, as mentioned above in the embodiment, the sheet discharged on the sheet delivery tray 7 is easily observable and can be easily taken out.

Further, since the operation part 5 can be turned independently of the swinging motion of the image reading part 4, the image processing apparatus according to the embodiment has a high rate of operability.

The display 6, which is provided on the operation part 5, is arranged to be freely erectable by the user in such a way as to make the display 6 easily operable. This arrangement further enhances the operability of the image processing apparatus.

The display 6 is further arranged to be capable of displaying thereon image information or text information, such as an electronic mail, transmitted through a network. The user is thus allowed to have such information displayed on the display 6 and to prepare a document by recording the displayed information on sheets at the image forming part 2. It is also possible to exchange data with other information terminals through wireless communication using infrared rays, an electromagnetic wave, etc.

Further, every operation and the operating state of the copying machine 1 can be displayed on the display 6. Further, with the copying machine 1 connected to a network, it is possible to grasp the working states of other terminals or apparatuses which are connected also to the network, and it is possible to operate other terminals or apparatuses through the network by using the copying machine 1.

With the display 6 arranged to be of the touch sensor type, it is possible to identify the user by the fingerprint of the user. If the operation on a start key of the copying machine 1 is linked to fingerprint collation, the user can use the copying machine 1 without being conscious of the fingerprint collation.

With the copying machine 1 including such a function, it becomes possible to automatically bill users for payment of fairs or expenses resulting from the use of the copying machine 1 by using identification data obtained from the fingerprint collation.

It is also possible to arrange the copying machine 1 to allow access to some coowned data only such persons who are proven to have the coownership by the fingerprint collation process. The fingerprint collation function thus can be advantageously used for personal security.

The fingerprint collation process also permits use of personal data individually set for the user, while the user is unconscious of the process. For example, with a desired font size of characters preset for printing, a document can be printed automatically according to the preset font size in printing the document by using the copying machine 1 through the fingerprint collation process.

Further, with the copying machine 1 arranged to include an automatic language translating function, data received in a foreign language can be translated into a desired language before printing the data or before transmitting the data. It is also possible that data read into the copying machine 1 can be translated into a foreign language before transmitting the data.

Further, with the copying machine 1 arranged to include a speech recognizing function, it becomes possible, for example, to set the copying machine 1 at a conference room to automatically prepare the minutes of a conference, to automatically send the contents of the minutes to the attendants, or to prepare data by recording the contents of the conference.

Next, a modification example of the embodiment of the invention will be described in detail with reference to FIGS. 4 to 7. All members of the modification example that are arranged and function in the same manner as those of the embodiment described above are denoted by the same reference numerals as those used in the foregoing description of the embodiment.

Figure 4:
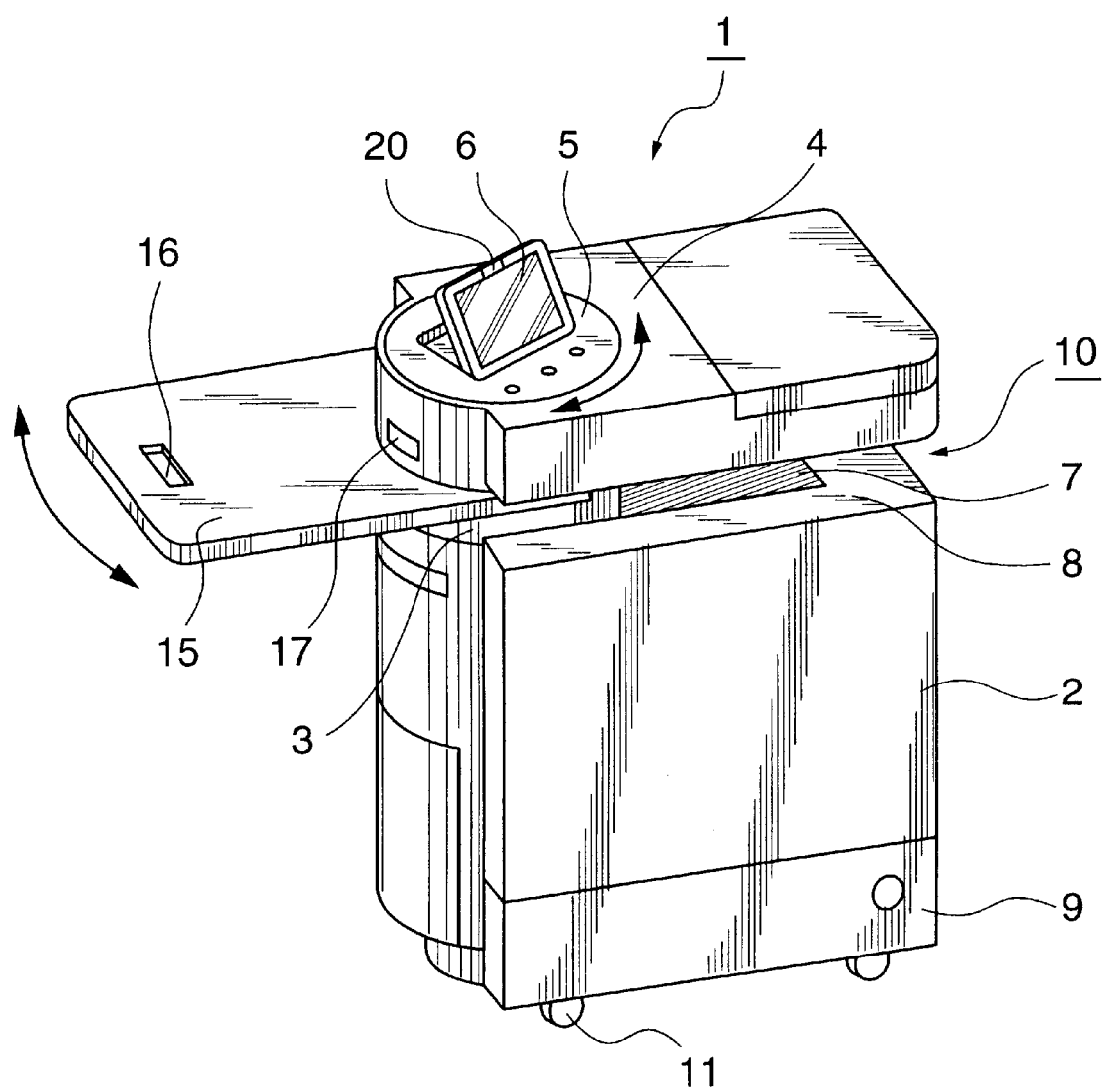
FIG. 4 is a perspective view showing the arrangement and operation of an image processing apparatus according a modification example of the embodiment of the invention.

As shown in FIG. 4, a table 15 (a table part), which is disposed below the image reading part 4, is arranged to be horizontally swingable around the support part 3. The table 15 has an area about equal to or less than the area occupied by the image reading part 4 and is supported by the support part 3 in such a way as to be swingable in directions indicated by arrows shown in FIG. 4 independently of the image reading part 4. The operation part 5 is also arranged to be turnable independently of the image reading part 4, in the same manner as in the case of the embodiment. The display 6 also can be erected in the same manner as in the case of the embodiment.

Figure 5:
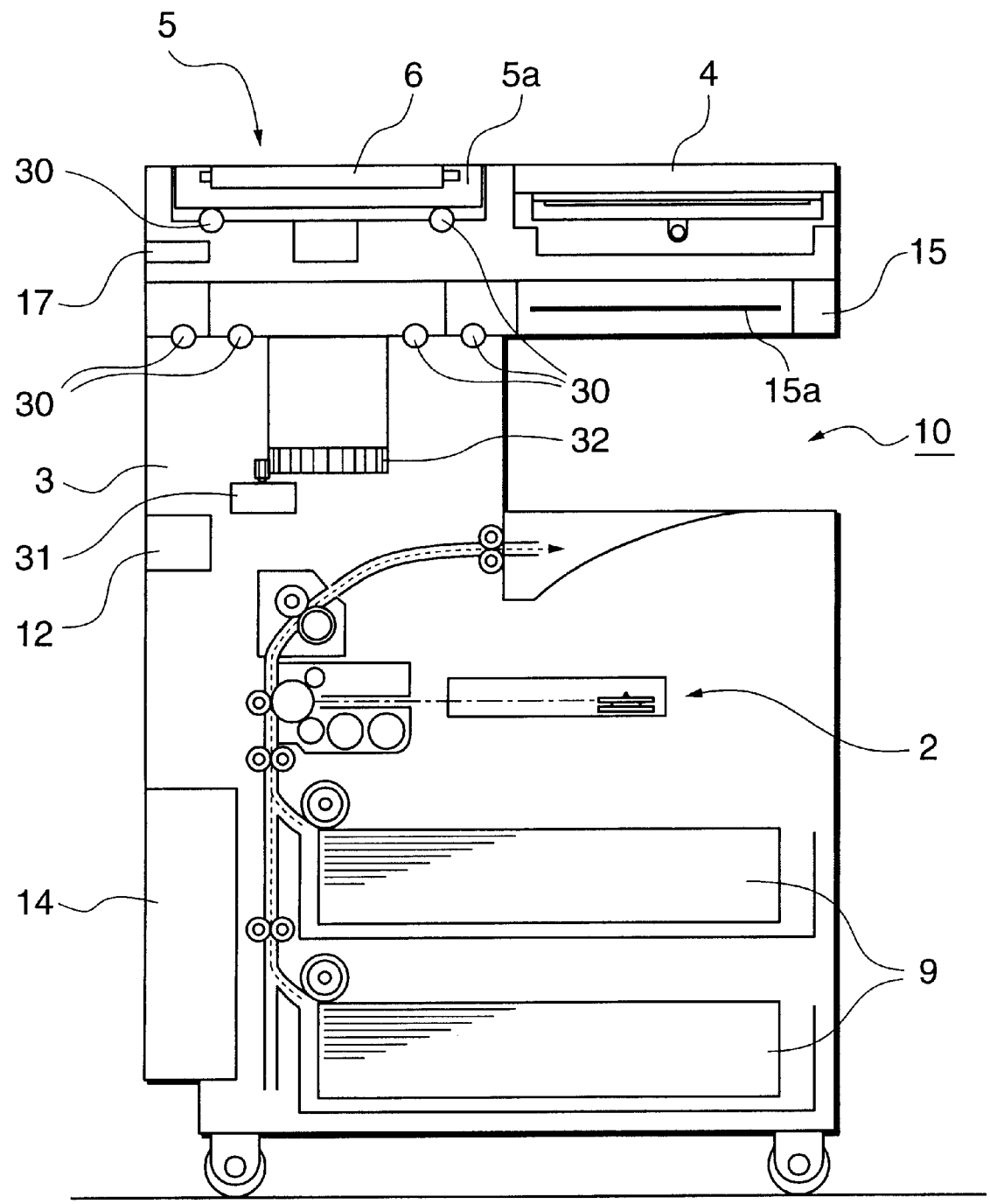
FIG. 5 is a sectional view showing in outline the image processing apparatus according the modification example.
Figure 6:
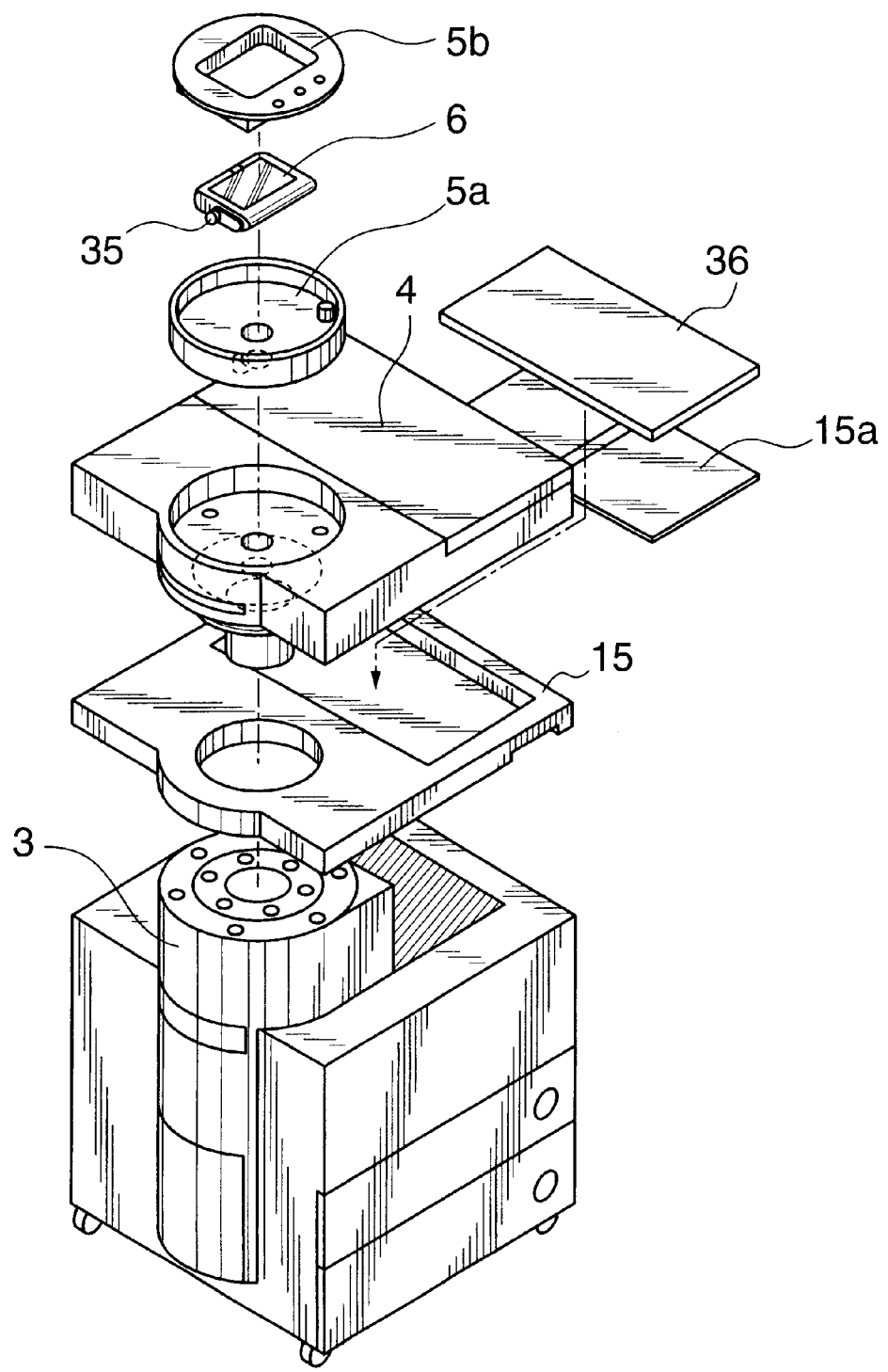
FIG. 6 is an exploded perspective view showing the arrangement of the image processing apparatus according the modification example.

FIG. 5 is a sectional view showing in outline the arrangement of the copying machine 1 according to the modification example, permitting a swinging motion on the support part 3. FIG. 6 is an exploded perspective view individually showing component parts of the copying machine 1 according to the modification example. The arrangement of the support part 3 and parts around it is described below with reference to FIGS. 5 and 6.

The axis of the support part 3 is indicated by a one-dot chain line in FIG. 6. With the axis of the support part 3 arranged as the center of swing, ball bearings 30 are arranged between the rotating frame 5a of the operation part 5 and the image reading part 4, between the table 15 and the support part 3 and between the image reading part 4 and the support part 3.

A motor 31, which serves as a driving means for swinging the image reading part 4, is disposed within the support part 3. The image reading part 4 is thus arranged to be freely swingable with respect to the image forming part 2 by a driving force transmitted to a rotary gear 32 which is in mesh with a gear of the motor 31.

Further, at a casing of the image reading part 4, there is provided the operation part 5, which has the display 6 disposed through the rotating frame 5a, in such a way as to be rotatable through the ball bearing 30. The display 6 is covered by a cover 5b so as to form the operation part 5.

A motor 35 is arranged on one side of the display 6 to be capable of causing the display 6 to erect. This arrangement enables the user to operate the operation part 5 after turning the operation part 5 to a desired direction independently of the image reading part 4 and the table 15 and also after erecting and tilting the display 6 at any angle desired in such a way as to be easily usable and easily viewable by the user.

The table 15 is arranged to allow electric parts 15a, such as a control circuit board, memory, etc., as a control means for control over the copying machine 1 to be disposed in an interior of the table 15. The electrical parts 15a are covered with a ceiling plate 36. The arrangement permits space saving for the image forming part 2, the image reading part 4, etc.

Further, as shown in FIG. 4, on the upper surface part of the table 15, there is provided a connector part or an inserting-type slot part 16, which is arranged as a communication interface conforming, for example, to the specifications of USB or IEEE 1394 for a portable information terminal such as a mobile computer. Further, on a side surface part of a member holding the operation part 5 and on the frame part of the display 6, there are respectively provided transmitting-receiving parts 17 and 20 for wireless communication to be conducted by transmitting and receiving wireless signals, such as infrared rays or a radio wave.

Figure 7:
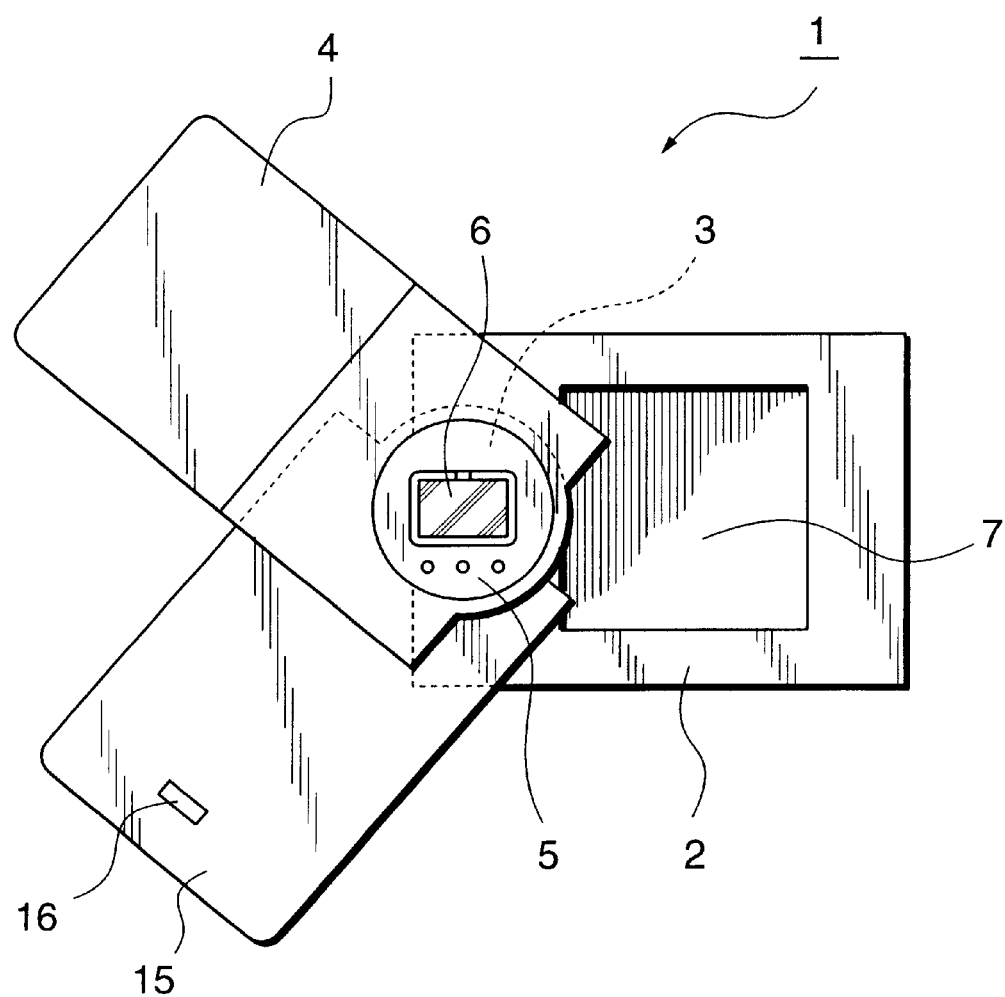
FIG. 7 is a top view showing the image processing apparatus according the modification example.

FIG. 7 is a top view of the copying machine 1 showing the state in which the image reading part 4 and the table 15 have swung independently of each other.

With the table 15 arranged to permit drawing it out by swinging it from beneath the image reading part 4 as described above, the copying machine 1 enables the user to easily perform image forming and image reading work by placing an original or a sheet on the table 15. The arrangement, therefore, enhances the usability of the copying machine 1.

The provision of the connector part (slot part) 16 on the upper surface part of the table 15 for connection with a portable information terminal such as a mobile computer enables the user to draw out the table 15, to put a portable telephone, a digital camera, a mobile computer or the like on the table 15, and to connect the copying machine 1 to the portable information terminal, so that information from the portable information terminal can be readily transmitted to the copying machine 1. Such information also can be printed there or transmitted or received through a network.

Further, with the information carried by the portable information terminal displayed on the display 6, it is possible to have discussion or make arrangement as desired around the copying machine 1.

The operation part 5, which is disposed above the support part 3, is arranged to be turnable independently of the image reading part 4 and the table 15. Therefore, the user can operate the copying machine 1 from at any angles 360 degrees around the copying machine 1. The arrangement enhances the usability of the copying machine 1, because the copying machine 1 is usable from any direction even in a case where the copying machine 1 is installed at the center of an office.

Further, since the transmitting-receiving parts 17 and 20 are disposed on the side surface part of the member holding the operation part 5 and on the frame part of the display 6, as mentioned above, the copying machine 1 is accessible from a position located far away from the copying machine 1. The copying machine 1 thus facilitates transmission and receiving of data and permits data to be coowned for use at a conference or at a like meeting.

Since the operation part 5 is arranged to be turnable, the transmitting-receiving part 20 disposed on the frame part of the display 6 allows wireless access to the copying machine 1 from any direction around the copy machine 1. Meanwhile, in a case where a portable information terminal such as a mobile computer is placed on the table 15, the transmitting-receiving part 17 disposed on the side surface part of the member holding the operation part 5 permits wireless communication with the portable information terminal.

The transmitting-receiving parts 17 and 20 may be arranged to use a radio wave or the like which is not readily affected by obstacles. A terminal part for a portable information terminal may be arranged inside the table 15 to permit charging the portable information terminal or data exchange therewith by connecting the portable information terminal to the terminal part within the table 15. It is also possible to have a plurality of such tables stacked, one on top of another.

At the support part 3, the image reading part 4, the table 15 and the operation part 5 are respectively arranged to be turnable as mentioned in the description of the modification example. However, this arrangement is applicable also to the embodiment which is not provided with the table 15 as described in the foregoing.

Next, a copying machine 1 serving as an image processing apparatus according to another modification example of the embodiment of the invention will be described with reference to FIG. 8.

In the case of this modification example, the image forming part 2, which is a printer, is arranged in combination with module-unitized systems respectively including the functions of a table part 27, an image reading part 4, a display part 23, a controller part 24, a projector part 25, etc. Thus, a multifunctional image processing apparatus can be formed by selecting these systems as necessary.

Figure 8:
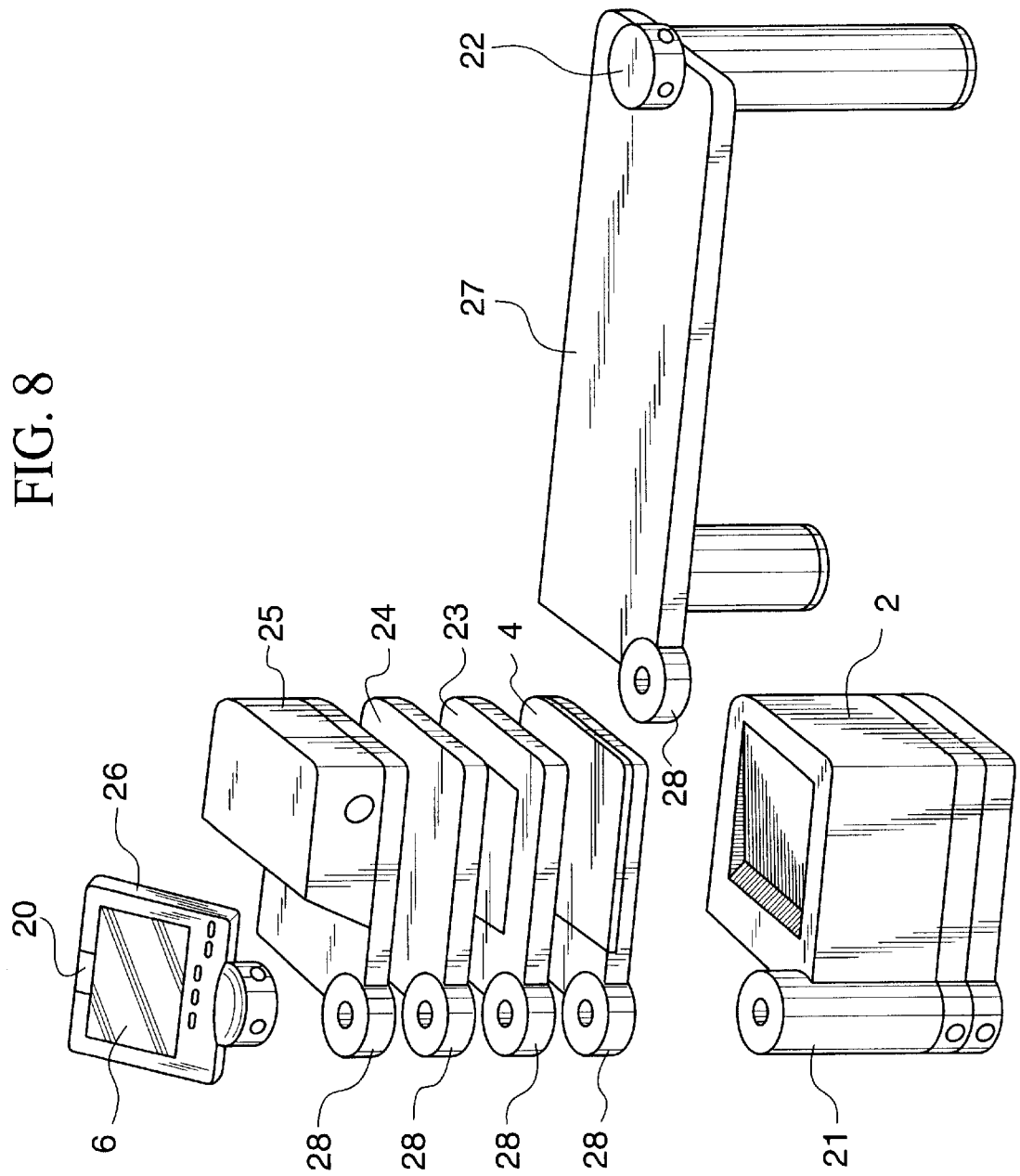
FIG. 8 is a perspective view showing in outline a system arrangement of an image processing apparatus according to another modification example of the embodiment of the invention.

Referring to FIG. 8, the display part 23 has a liquid crystal display mounted thereon. The controller part 24 is arranged to set the functions of a controller of the copying machine 1, a network server, etc. The projector part 25 is arranged to project an image on a screen or the like. An operation part 26 includes a display 6 having a built-in touch sensor. The operation part 26 is thus arranged to display the operating states of the copying machine 1 and to permit various input operations thereon. The image forming part 2 is also used as a leg of the table part 27. A port part 22 includes an interface for a USB or the like and a transmitting-receiving part for wireless communication and is arranged in the same manner as in the embodiment and the modification example described in the foregoing.

Each of the above-stated module units is provided with a connection part 28 for swingably mounting these module units, independently of each other, on a support part 21 provided at the image forming part 2. These connection parts 28 are arranged in a manner common to each other to permit them mountable on the support part 21 of the image forming part 2 in any combination or in any sequence. The arrangement permits the image processing apparatus to be arranged in a minimum necessary system scale or in a shape apposite to the place of installation. The image processing apparatus thus can be arranged to meet any of various needs of the user.

For example, in a case where the image processing apparatus is to be set at a conference room or the like, the table part 27 and the projector part 25 can be finely arranged to permit a plurality of persons to have discussion or making arrangement. Then, with the speech recognizing function included in the image processing apparatus as mentioned in the foregoing description of the embodiment, the conference or meeting can be allowed to efficiently proceed in a simplified manner, so that business executing efficiency can be enhanced.

Further, while, in the present modification example, the above systems have been described, by way of example, as a module-unitized system arrangement, the invention is not limited to the above systems.

As described in the foregoing, in accordance with the embodiment and the modification examples, an image processing apparatus which is capable of coping with the changes in office environment as mentioned in the foregoing description of related art can be arranged to enhance its usability and also to enhance the efficiency of business execution.

It is to be noted that the dimensions and shapes of component parts mentioned in the description of the embodiment and the modification examples are not intended to limit the scope of the invention without any specifying statement.

As has been described above, in accordance with the invention, an image processing apparatus which is capable of coping with changes in office environment expected to take place in the future as a result of the advancement of network arrangement and digital technology can be arranged as a multifunctional image processing apparatus playing a main role among other office automation equipments.

What is claimed is:

1. An image processing apparatus, comprising:

image forming means for forming an image on a sheet;

image reading means, disposed above said image forming means with a void space part formed between said image forming means and said image reading means, for reading image information from an original having the image information recorded thereon; and a sheet delivery part arranged to deliver the sheet having the image formed thereon by said image forming means into said void space part formed between said image forming means and said image reading means, wherein said image reading means is supported by a support part provided on a frame body in which said image forming means is housed, and is arranged to be horizontally swingable around said support part.

2. An image processing apparatus according to claim 1, further comprising driving means, disposed within said support part, for causing said image reading means to swing.

3. An image processing apparatus according to claim 1, further comprising a table part disposed below said image reading means and supported in a swingable manner by said support part.

4. An image processing apparatus according to claim 3, wherein said table part and said image reading means are respectively formed as module units independently of each other.

5. An image processing apparatus according to claim 4, wherein said module units can be stacked in a plurality of layers by said support part.

6. An image processing apparatus according to claim 5, wherein said module units stacked in a plurality of layers are arranged respectively to be swingable around said support part independently of each other.

7. An image processing apparatus according to claim 3, wherein said table part is arranged to be swingable independently of a swinging motion of said image reading means.

8. An image processing apparatus according to claim 3, further comprising control means, housed in an interior of said table part, for controlling said image processing apparatus.

9. An image processing apparatus according to claim 1, further comprising an operation part disposed above said support part and arranged to permit an operation on said image processing apparatus and to display a working state of said image processing apparatus.

10. An image processing apparatus according to claim 9, wherein said operation part is arranged to be turnable independently of said image reading means.

11. An image processing apparatus according to claim 1, further comprising electric power storage means capable of storing electric power supplied from an external power source, said image processing apparatus being able to be operated with electric power stored in said electric power storage means.

* * * * *

UNITED STATES PATENT AND TRADEMARK OFFICE
CERTIFICATE OF CORRECTION

PATENT NO. : 6,836,340 B2
DATED : December 28, 2004
INVENTOR(S) : Tsutomu Yoshihara et al.

It is certified that error appears in the above-identified patent and that said Letters Patent is hereby corrected as shown below:

<u>Column 1,</u>
Line 19, "apace" should read -- space --.

<u>Column 5,</u>
Line 33, "fairs" should read -- fares --.
Line 37, "only" should read -- only to --.

Signed and Sealed this

Thirty-first Day of May, 2005

JON W. DUDAS
*Director of the United States Patent and Trademark Office*